G. E. R. ROTHENBUCHER.
AUTOMATIC SAFETY BRAKE LOCK FOR AUTOMOBILES AND OTHER VEHICLES.
APPLICATION FILED AUG. 28, 1914.
1,142,845.
Patented June 15, 1915.
2 SHEETS—SHEET 1.
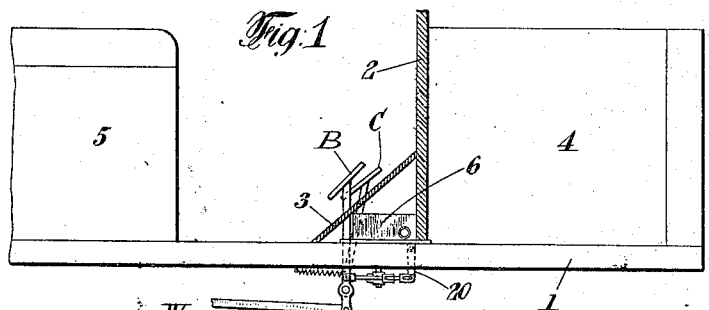
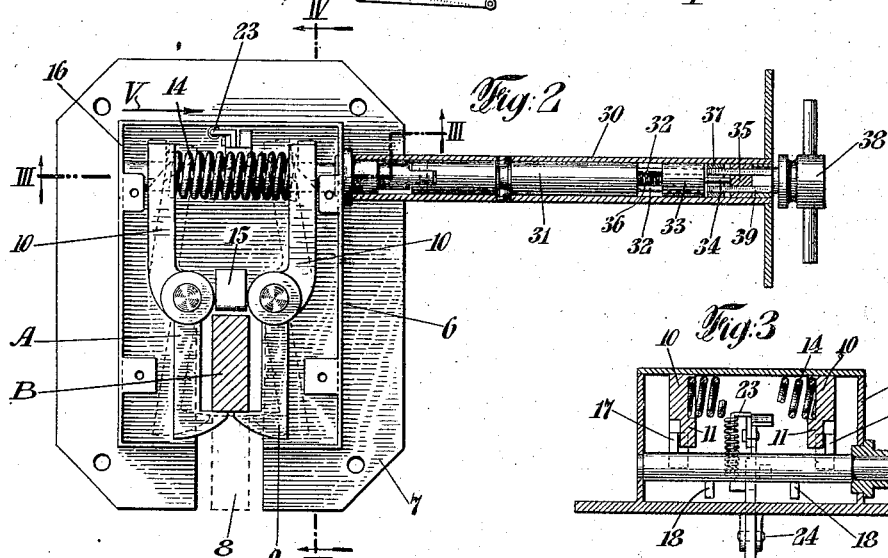
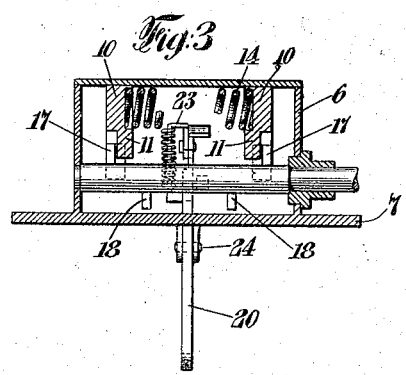
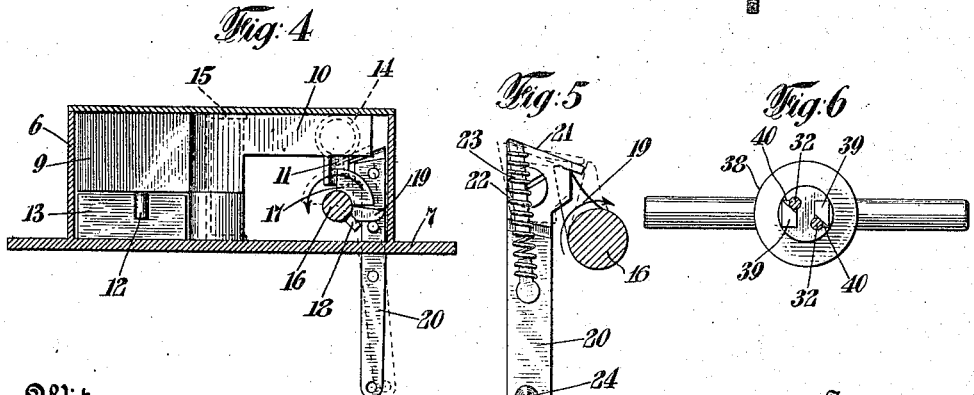
Witnesses:
John E. Prager
F. K. Miller
Inventor
George E. R. Rothenbucher,
By his Attorneys
Davis Davis

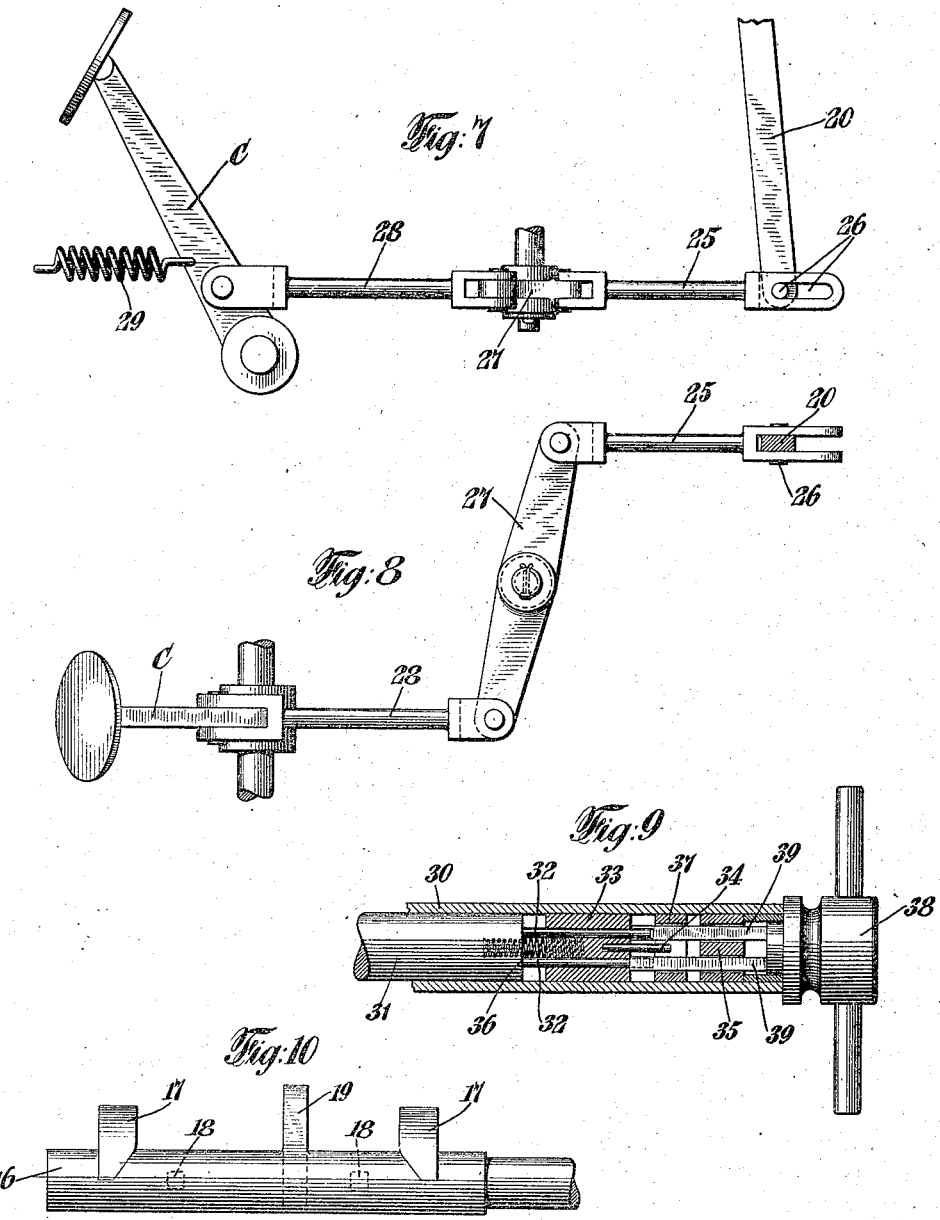

UNITED STATES PATENT OFFICE.

GEORGE E. R. ROTHENBUCHER, OF NEW YORK, N. Y., ASSIGNOR OF ONE-HALF TO ISIDOR KAHN, OF NEW YORK, N. Y.

AUTOMATIC SAFETY BRAKE-LOCK FOR AUTOMOBILES AND OTHER VEHICLES.

1,142,845.  Specification of Letters Patent.  Patented June 15, 1915.

Application filed August 28, 1914. Serial No. 859,020.

*To all whom it may concern:*

Be it known that I, GEORGE E. R. ROTHEN-BUCHER, a citizen of the United States, and resident of the borough of Bronx, county of Bronx, city and State of New York, have invented certain new and useful Improvements in Automatic Safety Brake-Locks for Automobiles and other Vehicles, of which the following is a specification.

One of the important objects of this invention is to provide means for automatically locking the brakes applied, said locking means being releasable by a special key, whereby the brakes cannot be released without the special device.

Another important object of the invention is to provide means whereby the brake lever will be locked with the brakes applied when the clutch operating lever is fully released.

There are other important objects and advantages of the invention which will appear more fully hereinafter.

In the drawings, Figure 1 is a side elevation of a portion of an automobile frame, the dashboard and foot-board being shown in sectional view; Fig. 2 a horizontal sectional view through the locking device; Fig. 3 a transverse sectional view on the line III—III of Fig. 2, the jaws being in their locked position; Fig. 4 a longitudinal sectional view on the line IV—IV of Fig. 2, the jaws being in their locked position; Fig. 5 a detail view of the upper end of the trip lever showing the tripping cam approaching its set position; Fig. 6 an end view of the releasing key; Fig. 7 a detail side elevation of the mechanism connecting the clutch lever with the trip lever; Fig. 8 a plan view of the devices shown in Fig. 7; Fig. 9 an enlarged sectional view of the key-operated means for releasing the lock; and Fig. 10 a detail view of the cam shaft which operates the locking dogs.

Referring to the various parts by numerals, 1 designates the frame of an automobile, 2 the dash and 3 the foot-board. 4 designates the usual hood over the engine and 5 the body.

B designates the brake lever and C the clutch lever.

Under the foot-board is arranged a casing 6 which contains the locking devices, said casing being rigidly secured in place by screws or other fastening means which are passed through the base flange 7 thereof. The forward portion of this casing is vertically slotted as at 8 said vertical slot being centrally located and passing entirely through the casing. The casing is so located with respect to the brake lever that when the said lever is thrown forward to apply the brakes it enters the slot 8 and passes to the inner end thereof. Mounted within the casing on two vertical pins are two horizontal locking jaws 9. These jaws are formed with rearwardly extending operating arms 10 on the under side of which near the rear ends thereof, are depending cam lugs 11. Each locking jaw carries a depending stop pin 12 which is adapted to engage the wall 13 when the jaws are moved to their locked position. Interposed between the rear ends of the operating arms 10 is a strong coil spring 14, said spring serving to throw the jaws to their locked position when the cam lugs 11 are released, as will be presently described.

15 is a post filling the space between the locking jaws adjacent their pivots.

Extending through the casing 6 below the lugs 11 is an operating cam shaft 16. This shaft is provided with two setting cams 17 which are adapted to engage the beveled surfaces of the lugs 11 when the shaft is rotated. These cams are so placed that upon the rotation of the shaft they engage the beveled portions of lugs 11 and force the rear ends of the arms 10 inwardly, thereby throwing outwardly the forward ends of the locking dogs to their open or released position for the purpose of releasing the locking jaws, in which position the rock shaft is held stationary until it is tripped, by means which will be hereinafter described. The cam shaft also carries two cams 18 which are spaced so that when the lugs 11 are released from cams 17 and are thrown outwardly by the coil spring 14 a slight further rotation of the rock shaft brings the cams 18 against the inner side of the lugs 11 and prevents any pivotal movement of the locking jaws. By means of these cams 18 the locking jaws cannot be released from the brake lever by any means applied to the jaws, and said jaws can only be released through the special devices which will be briefly hereinafter described. The rock shaft 16 is also provided with a central tripping cam 19 which is adapted to be engaged by the upper end of a tripping lever 20 on the upper end of which is secured a tripping dog 21. This dog is pivoted and is maintained in its normal operative position by a coil spring 22 which encircles a depending arm 23 carried by the dog and a pivoted device carried by the lever, the object being to yieldingly hold said dog in operative position, and to permit it to yield and allow the tripping cam and the cam shaft to pass thereunder to its tripping position, said dog immediately returning to its normal position after the passage of the tripping cam. When the cam shaft is in position to lock the jaws 9 in thir open position the tripping cam 19 bears against the forward edge of the tripping dog as indicated in dotted lines in Fig. 5. When the tripping lever is thrown forward as will be presently described, the cam shaft is rotated through the tripping dog pressing against the rear side of the tripping cam. This movement of the cam shaft is sufficient to carry the cams 17 away from the cam lugs 11, thereby releasing the locking jaws. Said movement is also sufficient to bring the locking cams 18 in position to engage the inner faces of the lugs 11 and thereby prevent the opening of the jaws 9 until the cam shaft is further rotated.

The trip lever is pivoted at 24 and to the lower end thereof is secured a rod 25, said connection being by means of a pin and slot 26. The rod 25 is connected to one end of a two-arm rocking lever 27, the other end of said lever being connected to a clutch lever C by a rod 28. A coil spring 29 returns the clutch lever to its normal released position. The slot 26 permits of the operation of the clutch lever in the usual manner without operating the trip lever 20. Said lever is not operated until the clutch lever has returned to its fully released position.

Any suitable special device may be used for returning the cam shaft to its set position and thereby releasing the clutch lever. The special device shown in the drawings is adapted to be operated by a simple but specially constructed rotatable key. Extending outwardly from the casing is a tube 30 in which is located a cam extension 31 of the cam shaft. To the end of this extension 31 are secured a pair of parallel outwardly extending rigid pins 32. Mounted to slide on said pins is a head or follower 33; and in the outer end of this follower block is a stop pin 34 which is adapted to engage the inner side of a rotatable stop ring 35. A coil spring 36 holds the follower block or head in its outer position and entirely covering the outer ends of the rigid pins 32. Interposed between the rotatable stop ring 35 and the follower block is a second rotatable stop ring 37, both of said rings being held against longitudinal movement in the tube. The ring 35 is provided with two rectangular apertures and ring 37 is provided with one large rectangular aperture. The operating key 38 is provided with two long key-bars 39. These bars fit the apertures in ring 35 and may pass through the aperture in the ring 37 when the two rings are brought into proper adjustment and register. The inner ends of the key-bars engage the follower block adjacent the ends of the rigid pins 32 and then by forcing the key inwardly said follower block is pressed against the spring 36 and the ends of the pins 32 uncovered. These pins are so placed that they are engaged by the inclined faces 40 at the inner ends of the key-bars, as shown clearly in Figs. 6 and 9. It is manifest that by rotating the key when it is in this position the rock shaft will be rotated. It is manifest that the cam shaft cannot be rotated to release the brake lever except by means of the proper key.

In setting the lock, the cam shaft 16 is rotated by means of the key 38, or by other suitable means in the direction indicated by the arrows in Figs. 4 and 5, this will cause the cam 17 to engage the cam lugs 11 on the locking jaws and to force them inwardly toward each other, thereby swinging outwardly the jaws 9. When the jaws 9 have been swung to their full open position, the tripping cam 19 engages the forward edge of the tripping dog 21 and swings said dog upwardly and rearwardly on its pivot and against the tension of the spring 23. This movement of the dog permits the tripping cam to pass by it and assumes the position shown in dotted lines in Fig. 5. As soon as the tripping cam has passed beyond the forward edge of the tripping dog, said dog snaps back to its normal position and its forward edge then lies in the path of the tripping cam. When the tripping dog has snapped back into the path of the tripping cam, the operator knows that the device is in its set position with the jaws 9 locked in their open position. When it is desired to lock the brake lever, the clutch lever is moved to its extreme position of release. This causes the tripping lever 20 to swing back toward the forward end of the car and moves the tripping dog 21 against the cam 19, thereby rotating the cam shaft 16 sufficiently to release the lugs 11 from the cam 17. The moment these lugs are released the jaws 9 are snapped to their locked position by the spring 14. The rotation of the shaft 16, through the movement of the tripping dog 21, is sufficient to bring the locking lugs 18 into the path of the lugs 11 and on the inner sides thereof, thereby preventing the opening of the jaws 9 until the shaft 16 is rotated by the proper key. Any suitable means may be employed for moving the tripping lever 20. It is thought, however, that by properly adjusting the connections between said lever and the clutch lever, the lock may be advantageously tripped through the clutch lever when said lever is at the extreme limits of its released position, without undue danger of locking the brake lever unintentionally. The means shown for operating the tripping lever 20 through the movement of the clutch lever is merely one of the methods which may be adopted for operating the lock. In setting the lock and releasing the brake lever, the clutch lever may be moved forward slightly to release the tripping lever 21. There is, however, sufficient lost motion in the clutch lever to permit this to be done without in any way affecting the operation in the clutch.

What I claim is:

1. An automatic safety brake lock comprising a brake lever locking means, means adapted to be connected to a clutch lever to release said brake lever locking means when the clutch lever is moved to its fully released position.

2. An automatic safety brake lock comprising a brake lever locking means, means for holding the locking means in its unlocked position, a trip device to release said holding means and means adapted to connect said trip device with a clutch lever to operate said trip device when the clutch lever is moved to its fully released position.

3. An automatic brake lock comprising a brake lever locking means, a spring for moving said locking means to its locked position, rotatable means for holding the locking means open and the spring under tension, a trip device for releasing said spring and means adapted to connect said trip device to a clutch lever whereby said trip device will be operated to release the locking means when the clutch lever is moved to its fully released position.

4. An automatic safety brake lock comprising a brake lever locking means, means for holding the locking means in its unlocked position, a trip device to release said holding means, means adapted to connect said trip device with a clutch lever to operate said trip device when the clutch lever is moved to its fully released position and a key device for releasing the locking means and resetting the trip device.

5. An automatic brake lock comprising a pair of locking jaws, a spring to hold said jaws in their locked position, a rotatable cam shaft adapted to place said spring under compression and to hold the jaws open, a trip device adapted to rotate said cam shaft to release the jaws, means adapted to connect said trip device to a clutch lever to operate the trip device when the clutch lever is moved to its fully released position and a key device adapted to rotate the cam shaft to release the jaws and set the trip device for the next operation.

6. A safety brake lock comprising a pair of locking jaws, a brake lever adapted to be received and locked in its set position by said jaws, a spring adapted to move said jaws to their locked position, a cam shaft carrying cams adapted to move said jaws to their open position and to thereby compress the spring, a trip device to rotate the cam shaft and thereby release the locking jaws, a pair of cams on said cam shaft adapted to hold the jaws in their locked position, means to operate the trip device, and a removable key device for rotating the cam shaft to open the locking jaws and reset the trip device.

7. A safety brake lock comprising a pair of locking jaws formed with rearwardly extending operating arms, a spring interposed between the rear ends of said arms, depending cam lugs carried by said arms, a camshaft, a pair of setting cams on said shaft adapted to engage said depending lugs to move the jaws to their open position and compress the said spring, a pair of cams on said shaft adapted to engage said depending lugs to lock the jaws closed after said jaws have been released from the setting cams, a trip lever, a yieldable tripping dog on the upper end of said lever, a trip cam on the cam shaft adapted to be engaged by the said dog, means to operate the trip lever to rotate the cam shaft and a key device for rotating the cam shaft to open the locking jaws and reset the trip device.

8. A safety brake lock comprising a locking means, a rotatable device for releasing said locking means and for setting the same, a trip device for operating said rotatable means to release the locking means, a key device for rotating said shaft for setting the locking means and the trip device, said key device comprising a pair of longitudinally extending key bars, a pair of longitudinally extending rigid key pins connected to the rotatable device, a yieldable follower normally covering the ends of said rigid key pins and adapted to be moved by the key bars to permit said bars to engage the ends of the key pins and a pair of independently rotatable stop rings adapted to permit of the passage of the key bars when said rings are in proper relation to each other said rings being interposed between the key device and the yieldable plunger.

In testimony whereof I hereunto affix my signature in the presence of two witnesses.

GEORGE E. R. ROTHENBUCHER.

Witnesses:
F. R. MILLER,
MINERVA VAN ALEN.